Figure 1:
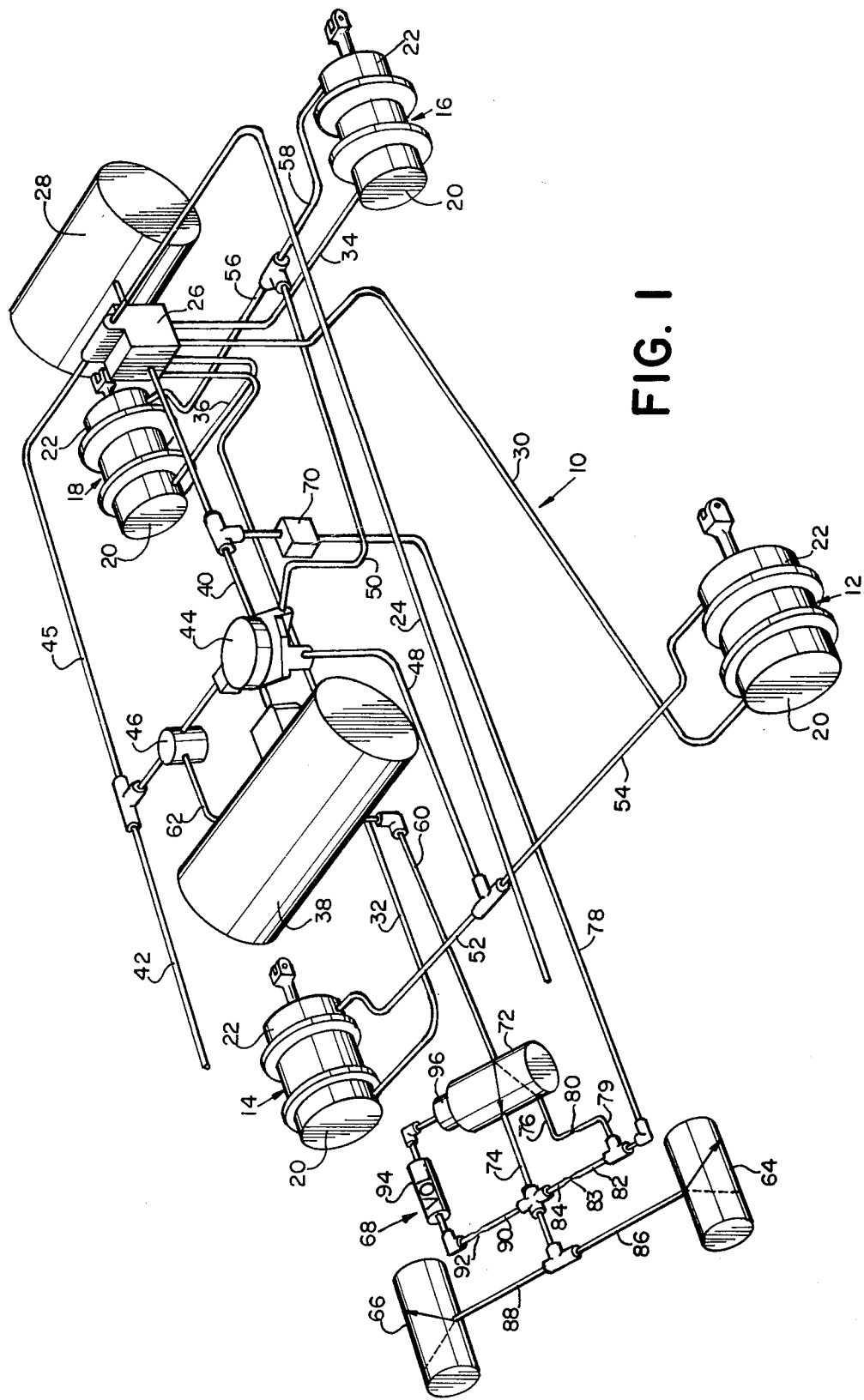

United States Patent [19]

Mekosh, Jr.

[11] 4,272,133
[45] Jun. 9, 1981

[54] ANTI-LOCKING WITH FAIL SAFE SYSTEM
[75] Inventor: George Mekosh, Jr., Warrington, Pa.
[73] Assignee: The Budd Company, Troy, Mich.
[21] Appl. No.: 35,260
[22] Filed: May 2, 1979
[51] Int. Cl.³ ............................................. B60T 8/093
[52] U.S. Cl. ................................. 303/99; 188/181 A; 303/118
[58] Field of Search ................ 303/99, 108, 115, 116, 303/117, 118, 7, 9; 188/181 A

[56] References Cited

U.S. PATENT DOCUMENTS

| | | | |
|---|---|---|---|
| 3,401,987 | 9/1968 | Horvath | 303/115 |
| 4,025,127 | 5/1977 | Rembold | 303/118 |
| 4,049,326 | 9/1977 | Zobel | 303/92 |

Primary Examiner—J. D. Miller
Assistant Examiner—Reinhard J. Eisenzopf
Attorney, Agent, or Firm—A. L. Trueax, Jr.

[57] ABSTRACT

An anti-lock system in a vehicle includes a valve system having normally closed valves responsive to the speed of the wheel of the vehicle. Pressure within the valve system controls the application of the braking pressure. Normal braking pressure is applied during normal deceleration of the vehicle. The valves open to release the pressure in the valve system to prevent braking during excessive deceleration of the vehicle. A time delay mechanism renders the valve system ineffective when the pressure therein drops and remains below a predetermined level for a predetermined time interval to thereby permit normal braking to be resumed.

15 Claims, 2 Drawing Figures

ANTI-LOCKING WITH FAIL SAFE SYSTEM

Brake control devices for preventing locking or sliding of vehicle wheels when the brakes are applied by an operator are well known. Such devices have included means for automatically controlling the release and reapplication of the wheel brake. Such "anti-lock" devices have been used in automotive vehicles such as trucks, truck trailers and buses, as well as in railway cars.

Brake control anti-lock devices have included, for example, rotary inertia type devices sensitive to acceleration and deceleration of a vehicle wheel, which may be installed within the hubs of existing truck-trailer wheels. Such devices have been described in copending patent applications entitled "Anti Locking System", Ser. No. 939,179, filed Sept. 5, 1979, now U.S. Pat. No. 4,229,051 and "Anti-Locking Mechanism", Ser. No. 026,795, filed Apr. 3, 1979.

If the valves or associated hoses in the anti-lock system become stuck, stay open or otherwise fail, it is necessary for a driver to recognize the presence of the condition and take appropriate action by applying the brakes through other available means. It is desirable in the event of failure of the anti-lock system to permit normal braking to be applied without the anti-lock system in operation.

It is an object of this invention to provide an improved anti-lock system for a vehicle in which fail safe means are included to render ineffective the anti-lock system in the event of failure of the system to operate effectively.

In accordance with the present invention, an anti-lock system for a vehicle to prevent the brakes from locking is provided. A source of braking pressure for applying braking pressure to said brake, such as a pedal, is provided to control the braking pressure to the brake. A pressurized valve system includes normally closed valves which may be attached to and which are responsive to the speed of the wheels of the vehicle. The pressure in the valve system controls the operation of the means for applying the braking pressure. The valve system pressure permits the braking pressure to be applied to said brake in a normal manner during normal braking operations. However, when the valves open as a result of excessive deceleration of the vehicle, the relatively low pressure in the valve system prevents braking pressure from being applied. Time delay means provide a "fail safe" operation of the anti-lock system by rendering ineffective the valve system when the pressure therein drops and remains below a predetermined level for a predetermined time interval thereby permitting normal braking to be resumed without the anti-lock feature.

Figure 2:
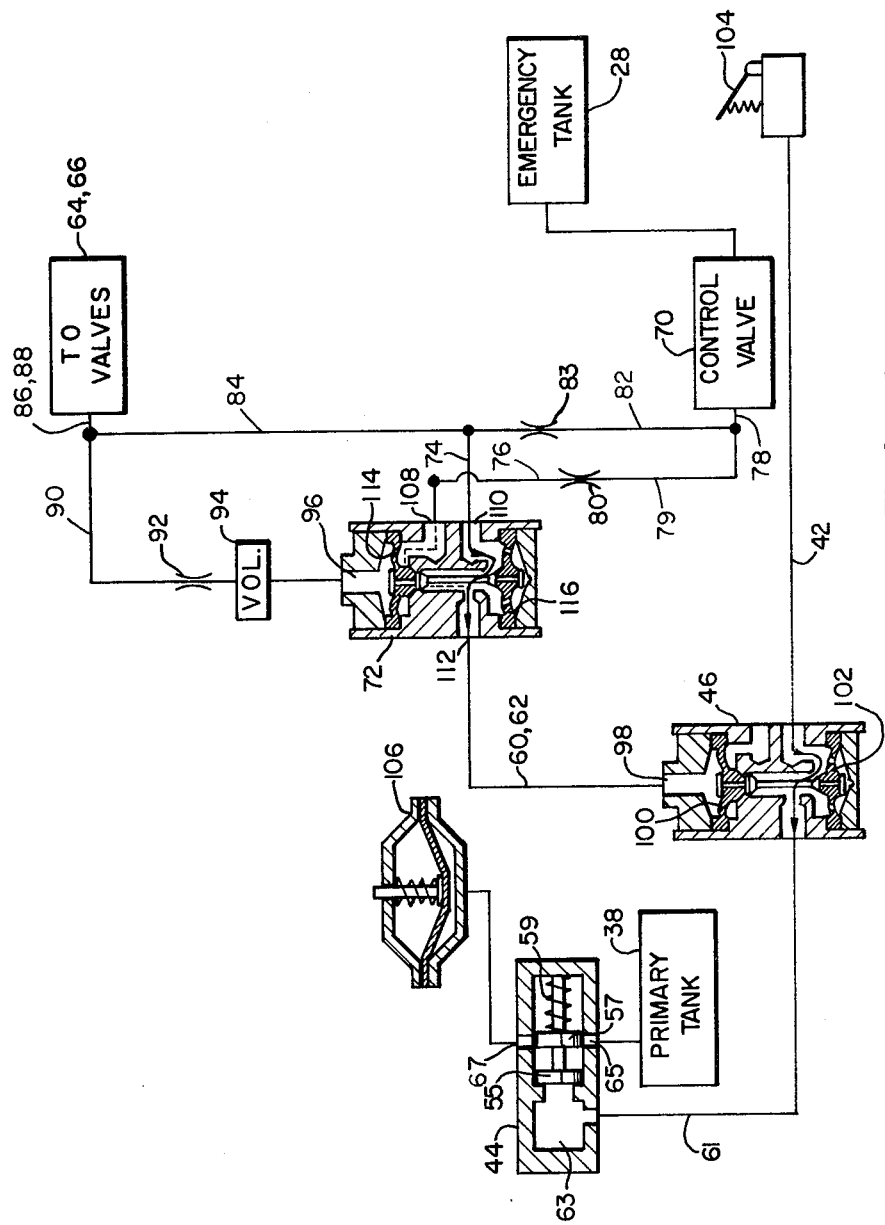

Other objects and advantages of the present invention will be apparent and suggest themselves to those skilled in the art, from a reading of the following specification and claims, taken in conjunction with the accompanying drawings, in which:

FIG. 1 is a schematic representative of a braking system for a trailer, embodying the present invention; and FIG. 2 is a portion of the system illustrated in FIG. 1, partly in broken diagram form illustrating the fail safe feature in an anti-lock system, in accordance with the present invention.

The components found in conventional systems will be described briefly for a better understanding of the invention.

As is well known, there are primary and emergency pressure tank systems included in most trailers. The emergency tank system is charged by air pressure from the tractor's system through an emergency supply line. When the air pressure from the tractor reaches a valve, generally referred to as a ratio relay valve, it charges the emergency tank, various hoses and the emergency side of the mechanical spring brakes. It also charges the primary tank.

When the pressure in the emergency tank reaches a predetermined level, such as 60 psi, the spring brakes begin to react and a shuttle valve in the ratio relay valve permits the air pressure to charge a primary tank. Generally, the spring brakes are completely released at a higher pressure, for example 90 psi.

Application of the parking brake or loss in the emergency line pressure will generally cause the pressure of the ratio relay valve to be relieved, and the air pressure is exhausted from the emergency brake hoses and spring brakes. When the pressure falls below 60 psi the mechanical spring brakes are automatically applied.

When the spring brakes are released and service brakes are applied by an operator in the tractor, air pressure will flow from a source within the tractor through the service line into the service system of the trailer.

The service pressure is applied to a relay valve which permits the air pressure in the primary tank to be applied to the service brakes.

Release of the service brakes causes the air pressure in the service line to be exhausted causing the relay valve to release the delivery air pressure from the service sides of the brake chambers to release the service brakes.

Referring particularly to FIG. 1, a brake system 10 of a two axle trailer includes a pair of front brake assemblies 12 and 14 and a pair of rear brake assemblies 16 and 18. All the brake assemblies illustrated may be of the conventional type. For example, each of the assemblies include a parking brake chamber 20 and a service brake chamber 22.

The main air pressure from the tractor is applied to an emergency or supply line 24. As air pressure reaches a ratio relay valve 26, it is directed to charge an emergency tank 28 and to hoses 30, 32, 34 and 36 which are connected to the parking brake chambers 20 of the brake assemblies 12, 14, 16 and 18, respectively. With no pressure in the parking brake line or hoses 30, 32, 34 and 36, the brakes are mechanically applied and the trailer cannot be moved.

When the pressure in the emergency tank 28 and hoses 30, 32, 34 and 36 reach a predetermined pressure, for example 60 psi, the parking brake springs (not illustrated) in the parking brake chambers 20 begin to release the brakes. As the pressure reaches 60 psi, a shuttle valve in the ratio relay valve 26 allows air pressure to charge a primary tank 38 through a line 40. The pressure in the tank 28 continues to raise to about 90 psi, for example. When the pressure in the primary tank 38 reaches 90 psi, the spring brakes are fully taken off and the trailer may be moved. As previously mentioned, application of the parking brake or loss in the supply line pressure will cause the pressure from the relay valve 26 to be relieved to thereby exhaust the air pressure from the parking brake chambers and thus mechanically reapply the spring brakes.

With the spring brakes released, application of the service brake, resulting from an operation inside the tractor will cause air pressure to be applied into the system from the tractor to the trailer through a service line 42. The service line 42 is normally at zero pressure until the service brakes are applied.

When the service brakes are applied, the relatively large volume of the primary tank 38 is applied to the service chambers 22 of the brake assemblies 12, 14, 16 and 18 through a relay valve 44. The service pressure is applied to the relay valve 44 through slave valve 46. The slave valve 46 is held open during normal operation by pressure and closes under a lock-up condition of the wheels of the vehicle, as will be subsequently described in greater detail. One side of the ratio relay valve 26 leading to a line 45 serves as an anti-compounder. This is not related to the invention, but anti-compounding generally prevents service pressure from adding to the supply pressure and prevents possible rupture of other components involved.

Pressure from a pilot line, to be described, normally maintains the slave valve 46 open. Greater service pressure which is applied by the operator to the brake pedal, for example, will cause more pressure to pass from the primary tank 38 through the relay valve 44 to the service brakes 22 through lines 48, 50, 52, 54, 56 and 58. Basically, the relay valve 44 may include a diaphragm disposed to receive pressure from the service line 42. Greater pressure on this diaphragm permits greater pressure to flow through the valve 44 from the primary tank 38 to the service brake chambers 22. When the driver or operator removes his foot from the pedal or other service pressure control mechanism, the pressure in the service line 42 drops and the pressure against the diaphragm in the relay valve 44 is released to prevent pressure from passing from the primary tank 38 to the service brake chambers 22.

The anti-lock mechanism described in the aforementioned copending patent applications, which may be used with the "fail safe" system involving the present invention, includes means for closing the normally open slave valve 46 to prevent pressure in the service line 42 from reaching the relay valve 44. With no service pressure applied to the relay valve 44, the pressure from the primary tank 38 to the service brake chambers 22 will be blocked. As a result, no pressure will be applied through the lines 48, 50, 52, 54, 56 and 58 to the service brake chambers 22 of the brake assemblies 12, 14, 16 and 18.

The slave valve 46 is normally held open by what will be referred to hereinafter as pilot pressure. This is the pressure in lines 60 and 62 which are connected to anti-lock devices generally indicated by valves 64 and 66, described in detail in the aforementioned copending patent applications. The anti-lock devices or inertia valves are connected to rotate with the wheels of a trailer, for example. The valves 64 and 66 form parts of a pressurized valve system, which provide an anti-lock system and a fail-safe arrangement 68 in the event of failure of the anti-lock system. Pressure to the lines 60 and 62 is supplied through the valve 26 and pressure regulator 70 from the emergency tank 28. The conduit 62 is connected to the slave valve 46 to provide pressure and to maintain it open.

The valves 64 and 66 are connected to the slave valve 46 through the fail-safe arrangement 68, to be subsequently described, to the conduits 62 and 60. The valves 64 and 66 are normally closed during normal braking operations. However, during "lock-up" one or more of the valves in the valve system will open and the pressure within the valve system, to be hereinafter called pilot pressure, which keeps the slave valve 46 open, is relieved causing the slave valve 46 to close. This prevents the service pressure from being applied from the service line 42 to the relay valve 44. Under these circumstances, braking pressure as applied from the primary tank 38 to the service brake chambers 22 is caused to drop off and escape through the appropriate exhaust ports in the relay valve 44 (not illustrated). After unlocking of the wheels occur, the inertia valves or sensors 64, 66 close and normal braking operations may be resumed.

The inertia valves or sensors may be considered as valves which, when closed, maintain the pilot pressure in lines 60 and 62 and allows the slave valve 46 to assume its normally open position. When the valves 64 and 66 open, the pilot pressure drops and the slave valve 46 closes. Closing of the slave valve 46 also permits any service pressure accumulated in the relay valve 44 to exhaust by ports not illustrated. When the wheel of the vehicle comes back up to speed, the inertia sensors or valves 64, 66 close permitting the pilot lines to repressurize. When the pilot lines are repressurized to about 40 psi, for example, the slave valve 46 opens to allow service pressure to resume flowing into the relay valve 44 thus permitting a reapplication of pressure from primary tank 38 to the service brake chambers 22.

The fail-safe arrangement 68, interposed between the valves 64, 66 and the slave valve 46 comprises a valve 72, illustrated schematically, to permit pressurized fluid to pass from either line 74 or 76 to lines 60, 62 dependent upon the operating state of the valve 72.

Pressure from the tank 28 is passed through the valve 26, pressure regulator 70 and line 78 at which point it may take one of two parallel paths. One path includes a line 79, an orifice device 80 and line 76 to valve 72. The second path from the line 78 passes through line 82, an orifice device 83, line 84 and line 74 to valve 72. Pressure therefore will pass from either line 74 or 76 through the valve 72 dependent upon the operating state of the valve 72. Pressure from the line 84 is also applied to the anti-lock valves 64 and 66 through lines 86 and 88, respectively.

The pilot pressure from line 84 is further applied through a line 90, an orifice device 92, a device providing a chamber or volume 94, to a pilot chamber 96 within the valve 72. As will be explained in greater detail in connection with FIG. 1, when pressure is applied to the pilot chamber 96, pressure will flow from line 74 into part 110 and out part 112 to line 60, as indicated by the solid arrow within the valve 72. When there is no pressure applied to the chamber 96, the valve 72 will switch operating states and pressure will flow therethrough from line 76 into part 108 and out part 112 to line 60, the flow path being illustrated by the dotted lines.

The fail-safe arrangement 68 provides a pressure controlled time delay before the valve 72 can switch the pressure path from the position illustrated by the solid arrow to the flow path illustrated by the dotted line.

Assume first a normal operating condition. The brakes may be applied and the anti-lock valves 64 and 66 and associated pressurized system are all operating properly. During normal operation, the valves 64 and 66 are closed when no braking is applied. Pressure is applied to the slave valve 46 to maintain it in a position so that service pressure from the line 42 may be applied to the valve 44 to permit braking pressure to be applied to the brakes from the tank 38 when braking is desired. During deceleration, as during braking, the valves 64 and 66 will open and close. When the valves 64 and 66 open, no braking is applied because the pilot pressure at the line 74 necessary to keep the valve 46 operative is too low. As the vehicle involved speeds up again because of the absence of braking, the valves 64 and 66 close again to permit braking to be applied. The valves 64 and 66 will open and close rapidly a relatively large number of times during a braking operation.

When the valves 64 and 66 and associated pressurized system is operating properly, i.e., the valves 64 and 66 are not stuck open, for example, the fail-safe arrangement 68 will not affect the operation of the system.

Assume now a situation in which one of the valves 64 and 66 become stuck in an open position or one of the lines 86 or 88 associated therewith leak excessively or become open. If this happens, there will be no pilot pressure at the line 74 to keep the slave valve 46 open. Also, after a time delay, there will be insufficient pressure applied to the pilot chamber 96 to maintan the pressure path from the line 74 through the valve 72. Because of the time delay, to be described, the pressure in the pilot chamber 96 does not drop abruptly when the pressure in the valve system drops. While the pressure in the chamber 96 starts to drop immediately, it will take some time interval before it drops sufficiently to switch the valve 72. Pressure in the chamber 96 starts to leak through a device providing a chamber or volume 94 and the orifice device 92. Finally, the valve 72 will switch operating conditions to provide a different path through the valve illustrated by dotted lines.

When the valve 72 switches to a position illustrated by the dotted lines, pilot pressure, originating at the tank 28 and still at the line 78, passes through line 79, orifice device 80, line 76, through valve 72, through lines 60 and 62 and finally to the slave valve 46. The braking may then proceed in a normal manner without the anti-lock system in operation.

Referring to FIG. 2, some of the main components of the anti-lock and fail-safe systems of FIG. 1 are illustrated with many of the conventional elements of the overall system being omitted for purposes of clarity.

The braking system, without regard to the anti-lock or fail-safe systems, will be described. It will be assumed that pilot pressure is present in the chamber 98 to maintain diaphragms 100 and 102 in a down position, as illustrated. The means for supplying the pilot pressure in the chamber 98 will be described later. Service pressure, which may result from the operation of a pedal 104 by a driver within the tractor, passes from the line 42 through the slave valves 46 to the relay valve 44.

A simplified version of the valve 44 includes a pair of pistons 55 and 57 biased by a spring 59. Pressure from the line 42, after passing through the open path of the valve 46, passes to a line 61. The pressure from the line 61 passes through an opening in the valve 44 into a chamber 63. The pressure in the chamber 63 opposes the force of the spring 59 to cause the piston 57 to move and unblock openings 65 and 67. The distance moved by the piston 57 is proportional to the service pressure from the line 61. Braking pressure is applied to a brake 106 from the primary tank 38 through the openings 65 and 67 of the valve 44.

As previously mentioned, the slave valve 46 opens or closes to permit or prevent service pressure therethrough depending upon its operating state. Its operating state is dpendent upon the presence of pilot pressure in the chamber 98. During an anti-locking operation, the pilot pressure within the chamber 98 will rapidly rise and fall intermittently to cause the diaphragms 100 and 102 to be raised and lowered and thereby block and unblock the application of service pressure. If the system is working properly, the opening and closing of the valve 46 will be very rapid.

In the event that there is trouble in the anti-lock system with respect to the valves 64 or 66 or any of the lines connected thereto, other means which will be described in further detail, are provided to permit pilot pressure to be applied to the chamber 98 to maintain the diaphragms 100 and 102 in down positions. This permits normal braking to take place without the anti-lock system being used.

Pressure is applied from the emergency tank or pressurized chamber 28, with the pressure being on the order of 100 psi, to a pressure regulator valve 70 which drops the pressure to approximately 40 psi. The output pressure from the pressure regulator 70 is applied to a pair of orifices 80 and 83. The orifice device 80 is connected to a port, generally designated as an exhaust port 108 of the valve 72 and the orifice device 83 is applied to the input port 110 of the valve 72. The pressure from the pressure regulator or control valve 70 will pass through the valve 72 to lines 60, 62 through either the in-port 110 or exhaust port 108 to a cylinder output port 112. The particular path through which the pressure will flow is dependent upon the operating state of the valve 72. This in turn is dependent upon whether or not there is pilot pressure present in its pilot chamber 96.

Pressure is also applied through the orifice device 83 and line 84 to the valves 64 and 66 and is also applied through line 90 to the orifice device 92 and chamber or volume 94 to the pilot chamber 96 of the valve 72. The pilot pressure in the chamber 96 forces the diaphragms 114 and 116 to the down positions, shown in FIG. 2. The pressure applied to the exhaust port 108 from the orifice device 80 will have no effect on the operation of the valve 72 because the exhaust port 108 is blocked. Pressure from the orifice 83 will therefore pass through the valve 72 through the in-port 110 and cylinder or output port 112.

The pressure flowing through the valve 72 is applied through lines 60, 62 to the pilot chamber 98 of the slave valve 46. This causes the diaphragm 100 and 102 to be moved down to permit normal braking to take place, as previously described.

During a normal anti-lock operation when the valves 64 and 66 open and close very rapidly, the pressure in the chamber 96 is maintained relatively high for a period of time because of the volume of the chamber 94 and the size of the opening in the orifice device 92. Consequently, the slave valve 46 will operate in a normal manner to permit both braking and anti-locking operations to take place.

In the event of failure of either of the valves 64 or 66 by being stuck open, for example, or because of any other defect in the lines associated with the valves, the pressure associated with the valve system will drop sharply to cause the pilot pressure in the chamber 96 to start leaking through the volume of device 94 and orifice device 92. After a short time, the pressure in the chamber 96 will not be sufficient to maintain the diaphragms 114 and 116 in down positions and the diaphragms will therefore move to up positions.

When the diaphragms 114 and 116 are in an up position, indicating that the anti-lock system is defective, pressure from the pressure regulator 70 will pass through the orifice device 80 to the exhaust port 108 of the valve 72. The pressure at the exhaust port 108 passes through the valve 72 around the stem therein to the cylinder output port 112. The pressure at 112, which is the pilot pressure, is applied to lines 60 and 62 and to the pilot chamber 98. At this point, the diaphragms 100 and 102 of the valve 46 are maintained in down positions continuously. Normal braking without any anti-lock action is therefore provided.

The time required for the pressure in the chamber 96 to drop is dependent upon the size of the volume provided by the chamber 94 and size of the orifice 92. These may be varied to provide any time delay interval desired. In general, a time delay somewhere between one second and ten seconds may be desired in different systems. In a preferred embodiment, a three second delay has been deemed satisfactory.

The size of the orifice 92 may be in the order of 0.013 inches and means for varying this size may be provided. The orifice 83 may be on the order of 0.047 inches and the orifice 80 may be on the order of 0.013 inches. The particular sizes of the orifice devices are not critical. Generally, the orifice device 83 will be somewhat larger than the orifice device 80 because it is desired to supply more pressure to the valve system including the valves 64 and 66. The pressure from the orifice device 80 only flows through the valve 72 without regard to the anti-lock system volume.

As is well known, the size of the orifice may be controlled by just controlling the size of a plate or washer within the tubing of the conduits or hoses used or by adjusting a needle valve. Generally, a solid plate or washer or hose fitting is used with the proper size hole being drilled therein.

In utilizing the present invention, when the anti-lock system is ineffective, a certain amount of pressure will still pass through the relatively small orifice 83 to the valve system including valves 64, 66. This pressure may produce an audible signal useful in trouble shooting for a defect in the system.

It is noted that another of the advantages of the system described in connection with the fail safe feature involves self correction. For example, if the trouble causing the anti-lock system to become ineffective is corrected, normal operation of the anti-lock system will resume automatically without any further action on the part of the operator. An example of this situation may be where one of the valves becomes temporarily struck open to cause the fail safe system to become operative and the anti-lock system ineffective. If the stuck valve suddenly closes and starts to operate properly, the anti-lock system will automatically come back into operation.

The term "fail safe" has been used throughout the specification. It is understood that this term is not intended to cover all situations in which trouble in the system may develop. In general, the term is limited to the operation of the elements in the anti-lock system which involve the pressure in the valve system, the valves in the system or lines associated with the valves.

Most of the devices illustrated are conventional and commercially available. For example, the ratio of relay valve 26 may be type 1659-8-B manufactured by B.F. Goodrich. The slave valve 46, as well as the valve 72, may be of the type 250-A-3-10-20 manufactured by Humphrey. The valve 44 relay valve may be type 286370 manufactured by Bendix-Westinghouse.

What is claimed is:

1. In combination with a wheel on a vehicle, having a brake associated therewith,
    a fluid pressure controlled anti-lock system comprising:
    (a) a source of braking pressure,
    (b) means for applying said braking pressure to said brake,
    (c) a valve system including normally closed valves responsive to the speed of said wheel having pressure therein to control the operation of said means for applying said braking pressure to permit braking pressure to be applied to said brake during normal braking operations,
    (d) said valves opening to release the pressure in said valve system to prevent braking pressure from being applied to said brake when the deceleration of said wheel exceeds a predetermined rate, and
    (e) pressure controlled time delay means for rendering ineffective said valve system when the pressure therein drops and remains below a predetermined level for a predetermined time interval while still permitting normal braking operations.

2. An anti-lock system as set forth in claim 1 wherein said means for applying said braking pressure to said brake comprises a first valve connected between said source of braking pressure and said brake.

3. An anti-lock system as set forth in claim 2 wherein a source of service pressure is connected through a second valve to control the operation of said first valve.

4. An anti-lock system as set forth in claim 3 wherein the pressure within said valve system is applied to said second valve to open said second valve to permit said service pressure to pass therethrough, said second valve becoming closed with the pressure in said valve system is low to prevent said service pressure from being applied to control said first valve.

5. An anti-lock system as set forth in claim 4 wherein the pressure within said valve system is supplied by a pressurized chamber.

6. An anti-lock system as set forth in claim 5 wherein a third valve is connected between said valve system and said second valve.

7. An anti-lock system as set forth in claim 6 wherein said pressurized chamber is connected through parallel paths through said third valve, one of said paths further leading to said valve system and the other of said paths by-passing said valve system and leading to said second valve.

8. An anti-lock system as set forth in claim 7 wherein said third valve has first and second operating states, with said pressurized chamber and said valve system being connected to said second valve when said third valve is operative in its first state and said pressurized chamber only being effectively connected to said second valve when said third valve is operative in its second state.

9. An anti-lock system as set forth in claim 8 wherein said third valve includes a pilot chamber and is maintained in said first operating state by pressure in said valve system being applied to said pilot chamber, and changes to said second operating state when the pressure within said valve system and said pilot chamber drops below a predetermined pressure level.

10. An anti-lock system as set forth in claim 9 wherein said time delay means includes pressure flow limiting means between the pilot chamber of said third valve and said valve system.

11. An anti-lock system as set forth in claim 10 wherein said pressure flow limiting means comprises an orifice device.

12. An anti-lock device as set forth in claim 11 wherein said pressure flow limiting means further includes a chamber.

13. An anti-lock system as set forth in claim 12 wherein two additional orifice devices are connected between said pressurized chamber and said parallel paths to said third valve.

14. An anti-lock system as set forth in claim 13 wherein a pressure regulator device controls the pressure from said pressurized chamber to said valve system and said third valve.

15. An anti-lock system as set forth in claim 1 wherein said valve system automatically becomes effective when the pressure therein resumes a pressure level higher than said predetermined level after said predetermined time interval.

* * * * *